(12) United States Patent
Greene

(10) Patent No.: US 6,970,765 B1
(45) Date of Patent: Nov. 29, 2005

(54) METHOD FOR PRODUCING UNIQUE AND HIGHLY CONTOURED WALL PANELS

(75) Inventor: David Gerald Greene, Claudville, VA (US)

(73) Assignee: Interlam, Inc., Claudville, VA (US)

( * ) Notice: Subject to any disclaimer, the term of this patent is extended or adjusted under 35 U.S.C. 154(b) by 38 days.

(21) Appl. No.: 10/730,393

(22) Filed: Dec. 8, 2003

(51) Int. Cl.[7] .............................................. G06F 19/00
(52) U.S. Cl. ....................... 700/186; 700/95
(58) Field of Search .............................. 700/90, 95, 96, 700/186

(56) References Cited

U.S. PATENT DOCUMENTS

| | | | |
|---|---|---|---|
| 4,868,761 A * | 9/1989 | Hayashi ..................... | 700/182 |
| 5,071,503 A * | 12/1991 | Berman ..................... | 156/250 |
| 5,119,309 A * | 6/1992 | Cavendish et al. ......... | 700/182 |
| 5,174,849 A | 12/1992 | Capaul | |
| 5,257,203 A * | 10/1993 | Riley et al. ................ | 700/163 |
| 5,432,704 A * | 7/1995 | Vouzelaud et al. ......... | 700/182 |
| 5,560,881 A | 10/1996 | Hillman et al. | |
| 5,568,391 A | 10/1996 | Mckee | |
| 5,590,046 A | 12/1996 | Anderson et al. | |
| 5,649,888 A | 7/1997 | Micale et al. | |
| 5,755,068 A | 5/1998 | Ormiston | |
| 5,943,775 A | 8/1999 | Lanahan et al. | |
| 6,021,358 A * | 2/2000 | Sachs ......................... | 700/98 |
| 6,292,715 B1 * | 9/2001 | Rongo ........................ | 700/249 |
| 6,334,280 B1 | 1/2002 | Frappart et al. | |
| 6,532,641 B2 | 3/2003 | Hillier | |

OTHER PUBLICATIONS

Modular Arts, cast gypsum panels for continuous sculptural surfaces, website: http://www.modulararts.com/, 1 page, no date.
Modular Arts, sculptural surfaces in continuous repeating panels, website: http://www.modulararts.com/home.html, 1 page, no date.
Modular Arts, Glass Fiber Reinforced Gypsum, website: http://www.modulararts.com/material.html, 1 page, no date.

* cited by examiner

Primary Examiner—Jayprakash N. Gandhi
(74) Attorney, Agent, or Firm—Craig A. Fieschko, Esq.; DeWitt Ross & Stevens S.C.

(57) ABSTRACT

Decorative wall panels are produced by providing mathematical formulae which define a contoured surface, and then cutting a portion of the defined surface into a board or boards. By defining a surface which has little or no repeats in the patterns defined in the surface (which can be done even for repeating functions by incorporating random number generators and/or conditional statements into the formulae defining the surface), and by cutting panels in accordance with different sections of the defined surface, panels may be produced which have little or no repeats and thereby have a highly customized and attractive appearance. Additionally, changes in panel designs may be accommodated without the need to generate new molds or dies.

22 Claims, 2 Drawing Sheets

METHOD FOR PRODUCING UNIQUE AND HIGHLY CONTOURED WALL PANELS

FIELD OF THE INVENTION

This document concerns an invention relating generally to the production of panels for decoratively finishing walls, and more specifically to methods for producing decorative wall panels which can each have a unique and customized appearance without the need to retool between the production of different panels

BACKGROUND OF THE INVENTION

In environments such as the lobbies and halls of commercial and government buildings, walls are often given a decorative appearance by installing contoured panels. These are sometimes fashioned from plain boards which are covered with fabric; in other instances, they may be fashioned from a series of decorative tiles which are similar to contoured ceiling tiles. Often, such contoured panels are installed not only for their decorative appearance, but also because their contours help to dampen echoes and thereby decrease ambient noise. Tile-like panels are often favored because they can usually provide a greater degree and variety of texture than a fabric-covered panel. Such tile-like panels are generally formed in the same manner as conventional ceiling tiles, with cementitious or other moldable material being cast into a desired shape, and/or with metal or plastic sheets being stamped into desired forms. With high-quality production processes, the panels can be quite beautiful, and when observed individually, each has the appearance of a high-quality work of art.

However, one drawback of these panels and their production methods is that they usually cannot provide significant variety in their appearance, particularly where large areas are to be covered with panels: because of costs, only a limited number of molds or stamps are produced, and thus a limited number of panel patterns/contours are produced. Thus, when the panels are hung, their patterns will eventually begin to repeat. This has the effect of diminishing the decorative effect of the panels, since they begin to become indistinguishable to observers. Additionally, their impact as artwork is greatly diminished: since they repeat, they convey the impression of being mass-produced, which detracts from their artistic feel. It would therefore be useful to have available methods of producing panels which reduce or eliminate these drawbacks.

DETAILED DESCRIPTION OF PREFERRED VERSIONS OF THE INVENTION

The invention involves a panel production method which is intended to at least partially solve the aforementioned problems, and allow the relatively rapid and inexpensive production of wall panels which are each unique, or which at least may have a low tendency for pattern repeats, and/or which might be granted a highly "organic" and appealing appearance owing to the introduction of deviations in repeating patterns and/or owing to the presence of contours which are not attainable via conventional stamping and casting processes. The invention is further intended to allow the rapid and inexpensive reconfiguration of the panel production tooling to produce panels having different designs without the need to produce new molds, stamping dies, or make other significant capital expenditures. So that the reader may attain a better understanding of the invention, which is defined by the claims set forth at the end of this document, following is a detailed description of preferred forms of the invention.

To produce panels in accordance with the invention, a user must first choose the material from which one or more wall panels are to be manufactured. As will be discussed below, the panels are preferably manufactured using computer-controlled machining tools such as saws and routers, though other forms of computer-controlled machining may be possible as well. Since CNC (computer numeric control) routers and the like require a machinable substance to work on—one which will not chip or break as a cutting head moves across its surface and removes material—particularly preferred materials for panel manufacturing include boards made of solid wood, medium density fiberboard (MDF), or calcium silicate (which is known for its fire-resistant properties). However, other machinable materials (e.g., plastic boards, metal slabs) are also possible material choices. It is also possible to apply the panel formation process described below to a slab or bed of soft/unfired ceramic material, which may then be fired or otherwise set to generate a finished panel.

Figure 1:
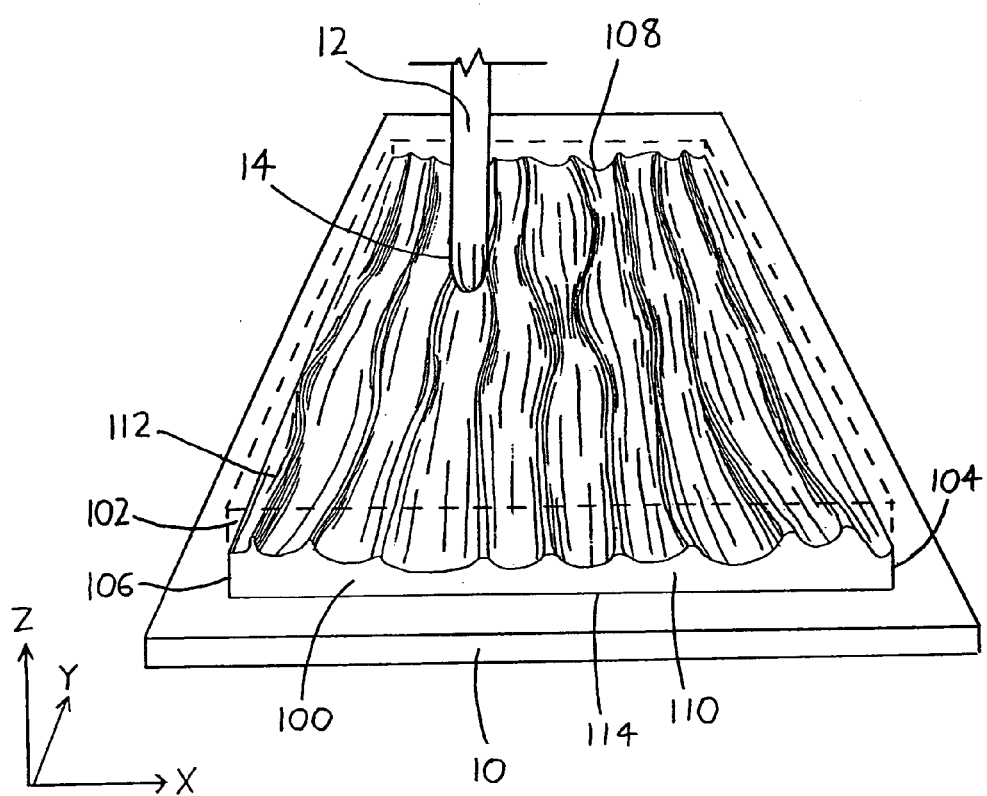
FIG. 1 schematically illustrates an exemplary panel 100 which may be produced in accordance with the methods of the invention, with the panel being cut by a computer-driven cutting head 12 from a board 102 (the original shape of which is illustrated in phantom).
Figure 2:
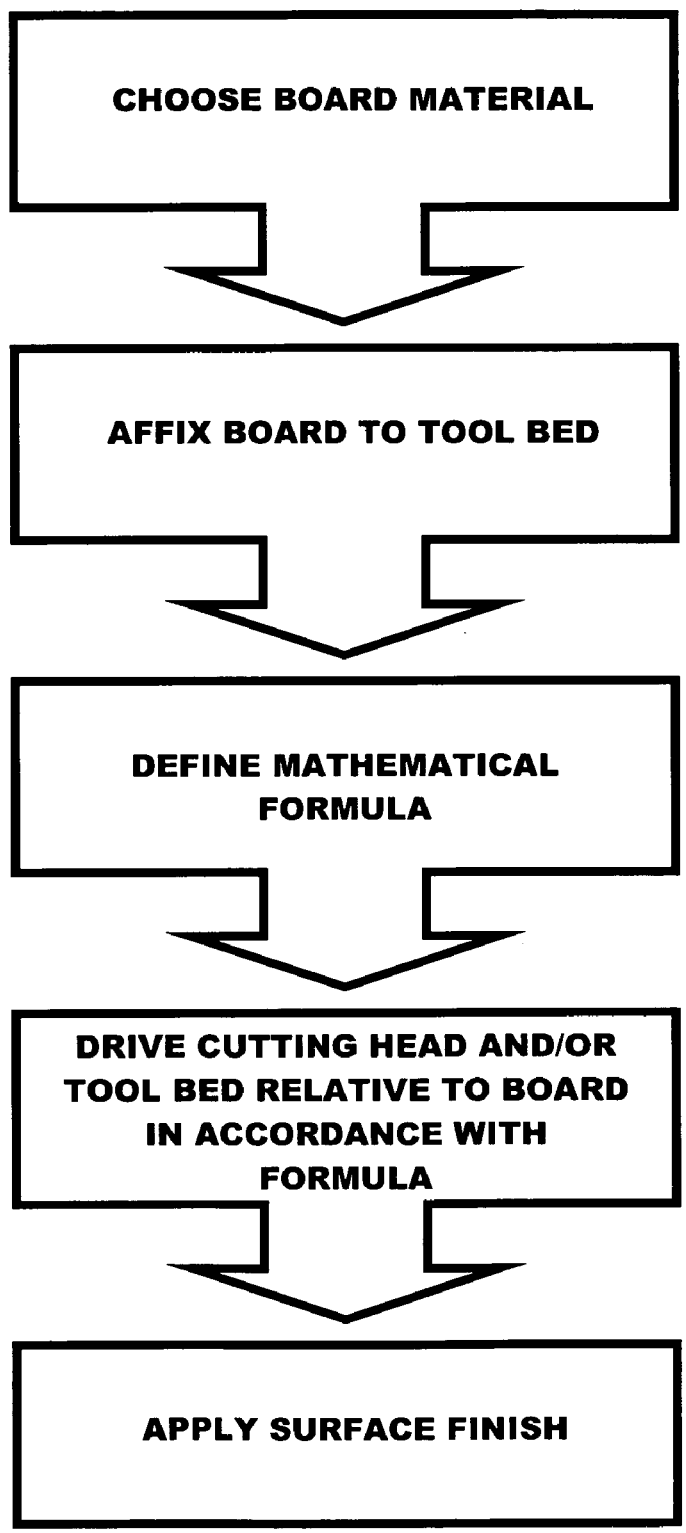
FIG. 2 is a flowchart schematically illustrating the steps of the process of the invention.

A board of the chosen material—depicted in phantom at 102 in FIG. 1—is then affixed to the tool bed (as by the use of fasteners, clamping, and/or by vacuum pressure) of a CNC machine tool or other computer-controlled cutting apparatus. In FIG. 1, such a tool bed is designated at 10. In common CNC machine tools, the cutting head—e.g., a saw blade rotating about a horizontal axis, or a rotary cutting head rotating about a vertical axis (as depicted at 12)—is driven about a horizontally-oriented XY plane across a board 102 or other substrate mounted on the CNC tool bed 10, with the tip or bottom edge 14 of the cutting head 12 having its position in the Z direction adjusted during such motion. Usually, motion between desired XYZ locations is achieved by moving between discrete XYZ points defined in a pointset generated by a CAD model of the desired endproduct: the surfaces of the CAD model are discretized into individual points representing the surfaces of the endproduct, and then the cutting head 12 moves between these points, generally by sequentially moving along lines of constant X (and varying Y and Z) or constant Y (and varying X and Z). Thus, the board 102 or substrate is shaped into the endproduct in multiple cutting passes. Motion of the cutting head 12 versus the tool bed 10 may be achieved in a variety of different ways, as by situating the board 102 on a stationary tool bed 10 and actuating the cutting head 12 to move in the X, Y, and Z directions; alternatively, the cutting head 12 may be held stationary and the tool bed 10 (and the board 102 affixed thereon) may be moved in the XYZ directions, or a combination of cutting head 12 and tool bed 10 motion can be used.

In the present invention, rather than using human design talent to generate a complete panel design, render this design using CAD processes, and then cutting a board 102 to produce the panel 100 in accordance with the CAD design, panels 100 are designed and cut from boards 102 in accordance with a mathematical formula which defines a surface in the XYZ domain. The mathematical formula may take a variety of forms, such as a simple polynomial equation, trigonometric function (also called circular functions, i.e., a function including one or more of sines, cosines, tangents, cotangents, secants, or cosecants of values, or the inverses of these functions), or other function (or a combination of the foregoing) which is normalized or otherwise rescaled so that the surface defined by the formula rests within the space defined by the board 102. As an example, where the board 102 illustrated in FIG. 1 is regarded as having an X width dimension bounded by opposing right and left surfaces 104 and 106, a Y height dimension bounded by opposing top and bottom surfaces 108 and 110 (deemed a "height" dimension since it will extend vertically when the panel 100 is mounted on a wall), and a Z depth dimension bounded by opposing front and rear surfaces 112 and 114, the illustrated panel 100 has a surface defined by the following equation:

$$z = \sin(b*Y+6*\{\sin\ [a*(X+5)+0.1*\sin(b*Y)+0.3*\sin(c*Y)]\}) + \sin(b*Y+6*\{\sin\ [a*X+0.3*\sin(b*Y)+0.1*\sin(c*Y)]\})$$

wherein
a=(2*pi)/24
b=(4*pi)/24
c=(12*pi)/24

And wherein z is rescaled to the depth value Z to fit within the boundaries of the illustrated board 102 by adjusting it in accordance with:

$$Z = z/9.76 - 0.305$$

It should be understood that the foregoing mathematical formula is merely exemplary, and a wide variety of other formulae may be used instead, leading to panels 100 having differently-contoured surfaces. The formulae may vary in complexity, and may incorporate features such as random number generators to constantly or periodically vary the contour (Z depth) of the panel 100 over the XY plane, or they could incorporate conditional statements which change formulae and/or their features when some predefined condition is met. As an example, a formula may be defined and then applied to a panel 100 without first rescaling the formula to fit within the boundaries of the board 102, and a conditional statement might then be applied whereby if the Z depth value is outside the Z depth of the board 102 for a given XY value (i.e., if it does not touch the top surface 108 of the board 102, or if it penetrates or grows undesirably near the bottom surface 110 of the board 102), the Z value is divided by some value which rescales it to fit within the boundaries of the board 102 (with this divisor being incremented, decremented, or otherwise changed if it is initially insufficient to place the Z value within the board 102). The use of random number generators and/or conditional statements is appealing because in some cases it can generate a sudden and significant change in the appearance of a board owing to an alteration in the fundamental underlying formulae. To illustrate, a conditional statement might generate a new contour pattern over regions of a formula which have Z depths resting outside board boundaries, or a randon number generator might periodically change the appearance of the panel (or might randomly alter the nature of the surface formula once a conditional statement is triggered).

Once the mathematical formula is defined and a board 102 of the chosen panel material is affixed to the tool bed 10, the cutting head 12 and/or tool bed 10 are driven relative to each other so that the cutting head 12 is driven across the board 100 in accordance with the mathematical formula to cut the front surface 112 of the board 100, giving the board 100 a contour reflecting the calculated Z values over the X and Y dimensions of the board 100. While it can be possible to generate Z values (and drive the cutting head 12 and/or tool bed 10) "on the fly" (e.g., by simply incrementing X and/or Y values, calculating corresponding Z values, and then moving the cutting head 12 and/or tool bed 10 accordingly), the programming of some CNC tools must be significantly modified to implement such "on the fly" calculation. Therefore, it is preferred to generate a board pointset before beginning cutting, with the pointset being generated by discretizing the X and Y dimensions of the board 102—e.g., by determining XY points evenly arrayed at discrete space increments across the board 102 (such as at every 0.1 inch across the dimensions of the board 102)—and then calculating all Z depth values at these XY points. In this manner, the CNC tool can simply move the cutting head 12 and/or tool bed 10 from point to point in the pointset until the entire surface of the panel 100 has been cut into the board 102. For example, the CNC tool might first place the cutting head 12 at the point that has the lowest X and Y values (adjacent the left and bottom surfaces 106 and 110), and might then drive the cutting head 12 along lines of constant Y height and increasing X width, with the Z depth varying accordingly, until the right surface 104 of the board 102 is reached. The cutting tool might then increment the cutting head 12 to the next row of points along the Y height dimension and run along the line of decreasing X width to the defined Z depths until the left surface 106 is again reached. The panel 100 may be completed by making multiple tool passes in this manner until the entire top surface 108 of the board 102 is cut.

If the panel 102 is cut via motion between points in a board pointset, it is useful to define the path of motion between the points. A simple linear path from point to point could be used; however, if the spacing of the XY points in the pointset is relatively coarse (i.e., if the XY points rest more distantly from each other), this can lead to panels 100 which have a faceted appearance. So that the panels 100 have a less machine-made and more "organic" appearance, it is preferred that the path of travel between adjacent points in the pointset be defined as an arcuate path, e.g., as an arc of a circle having some predetermined radius, or by moving along a path defined by a quadratic polynomial or cubic polynomial defined between a point and its prior and/or subsequent points, rather than by simple linear interpolation between points.

Subsequent panels 100 may then be produced by repeating the foregoing process. It is easily possible to generate a second panel for placement adjacent to the first panel, and which is contoured to extend the surface function of the first panel such that the second panel has a continuously matching edge with the first panel at the juncture between the two panels (i.e., such that the Z depths of the panels are matched at the locations where their right and left surfaces abut, along all values of the heights of the first and second panels). This can be done by simply generating a second board pointset having X width and Y height values which are adjacent to (but which have no or minor overlap with) the X width and Y height values chosen for the first board pointset. In other words, the second board is cut with a pointset which simply continues to represent the defined mathematical formula at a section of the XY plane adjacent to the section containing the first board pointset (and defining the first panel). It should be appreciated that this approach can allow continuity in the patterns of abutting panels having any shapes or sizes, and/or any form of abutting relationship (e.g., with panels being situated side-by-side, but with staggered bottom surfaces) by simply defining the pointsets for the panels over the appropriate sections of the XY plane. It should also be appreciated that the use of mathematical formulae to define and form panels, as opposed to the use of molds or stamping dyes, allows for far more rapid and inexpensive retooling when a change in panel patterns is desired.

Once a panel 100 has been cut, a decorative and/or protective finish, such as a stain, paint, or lacquer, may be provided on its cut front surface 112 if desired. The panel 100 may then be installed on a wall in a conventional manner (e.g., by fasteners, attachment brackets, and/or construction mastic). Any adjacent panels (if used) may similarly be installed in abutment with, or spaced from, prior panels.

It should be understood that the foregoing discussion merely involves a particularly preferred version of the invention, and the invention may take other forms. The invention is not intended to be limited to the preferred version of the invention described above, but rather is intended to be limited only by the claims set out below. Thus, the invention encompasses all different versions that fall literally or equivalently within the scope of these claims.

What is claimed is:

1. A method of producing decorative panels using a computer-driven machining tool having a tool bed and a cutting head, the method comprising:
    a. affixing a board formed of machinable material to the tool bed, the board having:
        (1) an X width dimension bounded by opposing right and left surfaces, and
        (2) a Y height dimension bounded by opposing top and bottom surfaces,
        (3) a Z depth dimension bounded by opposing front and rear surfaces;
    b. providing a mathematical formula which defines a surface in the XYZ domain, the surface having a Z depth which varies across the XY plane;
    c. driving at least one of the cutting head and tool bed to cut the front surface of the board in accordance with at least a portion of the defined surface; and
    d. installing the rear surface of the board on a wall.

2. The method of claim 1:
    a. further comprising the step of generating a pointset from the mathematical formula, the pointset having:
        (1) spaced points distributed across the X width and Y height dimensions of the board, and
        (2) the corresponding Z depths being defined by the mathematical formula;
    b. wherein the step of driving at least one of the cutting head and tool bed to cut the front surface of the board is performed by driving between the spaced points.

3. The method of claim 2 wherein at least one of the cutting head and tool bed is driven nonlinearly from each of the spaced points to the next to cut the front surface of the board.

4. The method of claim 2 wherein at least one of the cutting head and tool bed is driven in an arcuate path from each of the spaced points to the next to cut the front surface of the board.

5. The method of claim 2 wherein the step of driving at least one of the cutting head and tool bed to cut the front surface of the board includes the substeps of:
    a. selecting a first subset of the points in the generated pointset; and
    b. driving between the spaced points in the first subset.

6. The method of claim 5 further comprising the step of cutting a second board by driving at least one of the cutting head and tool about the second board between at least some of the spaced points in the generated pointset which are not included in the first subset.

7. The method of claim 5 further comprising the step of cutting a second board by:
    a. selecting a second subset of the points in the generated pointset, the second subset including points excluded from the first subset; and
    b. driving between the points in the second subset.

8. The method of claim 1:
    wherein for each Y value of the height between the top and bottom surfaces, the mathematical formula defines the same Z depth values on the right and left surfaces;
    whereby a pair of boards cut in accordance with claim 1, and placed in abutment so that the right side of one board meets the left side of the other board, will have continuous Z depth across their adjoined sides.

9. The method of claim 1 further comprising the step of treating the cut front surface of the board with at least one of:
    a. a protective coating; and
    b. a decorative coating.

10. The method of claim 1 wherein the mathematical formula includes one or more of:
    a. a trigonometric function;
    b. a polynomial function; and
    c. a random number generator.

11. The method of claim 1 wherein:
    a. the mathematical formula is defined across at least the entireties of the X width and Y height dimensions of the board; and
    b. the rear surface of the board is installed on the wall of a building.

12. A method of producing decorative panels using a computer-driven machining tool having a tool bed and a cutting head, the method comprising:
    a. affixing a board formed of machinable material to the tool bed, the board having:
        (1) a rear surface, and
        (2) an opposing front surface with an X width dimension, a Y height dimension, and a Z depth dimension;
    b. providing a mathematical formula which defines a surface in the XYZ domain, the surface having a nonuniform Z depth across the XY plane;
    c. generating a first pointset from the mathematical formula, the first pointset having:
        (1) spaced X and Y point pairs distributed across the X width and Y height dimensions of the board, and
        (2) corresponding Z depths defined by the mathematical formula in accordance with the X and Y point pairs;
    d. driving at least one of the cutting head and tool bed to move the cutting head along the front surface of the board between the spaced points in the first pointset, thereby machining the board to have a front surface substantially corresponding to the surface defined by the mathematical formula.

13. The method of claim 12 wherein at least one of the cutting head and tool bed is driven nonlinearly from each of the spaced points to the next to cut the front surface of the board.

14. The method of claim 12 further comprising the step of cutting a second board by:

a. generating a second pointset from the mathematical formula, the second pointset including X and Y point pairs excluded from the first pointset; and b. driving between the points in the second pointset.

15. The method of claim 12:

wherein for each Y value along the height of the board, the mathematical formula defines the same Z depth values on the boundaries of the width of the board, whereby a pair of boards cut in accordance with claim 12, and placed in abutment with their widths situated side by side, will have continuous Z depth across their adjoined sides.

16. The method of claim 12 further comprising installing the rear surface of the board on a wall.

17. The method of claim 12 further comprising the step of treating the cut front surface of the board with at least one of:

a. a protective coating; and b. a decorative coating.

18. The method of claim 12 wherein the mathematical formula is defined across at least the entireties of the X width and Y height dimensions of the board.

19. A method of producing decorative panels using a computer-driven machining tool having a tool bed and a cutting head, the method comprising:

a. providing a mathematical formula which defines a surface in the XYZ domain, the surface having a varying Z depth across the XY plane;

b. generating two or more board pointsets from the mathematical formula, each board pointset having:

(1) spaced X and Y point pairs distributed across the X width and Y height dimensions of the board, and (2) Z depths defined by the mathematical formula in accordance with the X and Y point pairs, and wherein the board pointsets have little or no overlap in X and Y point pairs;

c. machining two or more boards, each board having:

(1) a rear surface, and (2) an opposing front surface with an X width dimension, a Y height dimension, and a Z depth dimension, wherein each board is machined by moving the cutting head relative to the front surface of the board in accordance with a respective one of the board pointsets.

20. The method of claim 19:

wherein each of the generated board pointsets has a boundary with X and Y point pairs situated adjacent the X and Y point pairs in the boundary of another one of the generated board pointsets, whereby the machined boards, if situated with their boundaries in abutment, have the same Z depth at their adjoined boundaries.

21. The method of claim 19 further comprising installing the rear surfaces of the boards on a wall, with the boards having boundaries situated in abutment.

22. The method of claim 19 further comprising the step of treating the cut front surfaces of the boards with at least one of:

a. a protective coating; and b. a decorative coating.

* * * * *